United States Patent [19]
Schmidt

[11] 3,775,856
[45] Dec. 4, 1973

[54] TILE SETTING TEMPLATE

[76] Inventor: Henry Schmidt, 1111 12th St., Santa Monica, Calif. 90403

[22] Filed: Aug. 11, 1971

[21] Appl. No.: 170,703

[52] U.S. Cl. ......... 33/180 R, 33/174 G, 33/DIG. 20
[51] Int. Cl. ............................................... G01b 5/16
[58] Field of Search .................. 33/174 G, DIG. 20, 33/174 R, 180 R

[56] References Cited
UNITED STATES PATENTS

| | | | |
|---|---|---|---|
| 2,466,919 | 4/1949 | Sykes | 33/174 G |
| 2,852,932 | 9/1958 | Cable | 33/180 R |
| 2,930,135 | 3/1960 | Rodtz | 33/180 |
| 3,254,417 | 6/1966 | Carmichael | 33/180 R |

Primary Examiner—Robert B. Hull
Assistant Examiner—Richard R. Stearns
Attorney—William H. Maxwell

[57] ABSTRACT

A template in the form of a rack, for setting tile expeditiously and with accuracy regardless of pattern complexity while minimizing "straightening up" procedures. This template is a time saving tool when made of moderate size for ease of handling, and multiple units thereof are cooperatively employed as distinguished from large and cumbersome units that are easily damaged with consequently developed imperfections. This template is of characteristic quadrilateral plan configuration having tile receiving pockets sized and shaped according to the tile to be set, and the pockets arranged according to the pattern thereof that is desired. The marginal members of interengaged templates are disposed so as to mate and jointly occupy the joints between the tile which are later grouted; and the rack members which space the tile are held positioned above the tile supporting floor or base by means of localized supports that depend within the confines of the said joints between the said tile.

3 Claims, 8 Drawing Figures

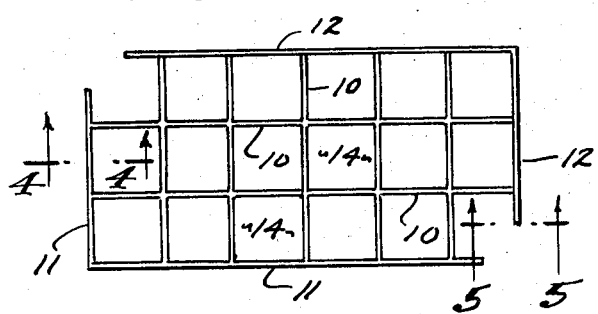
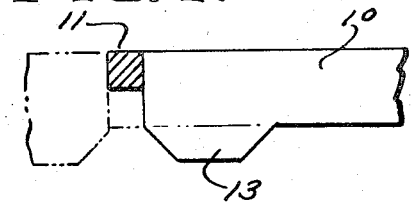
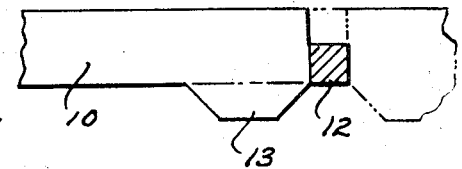
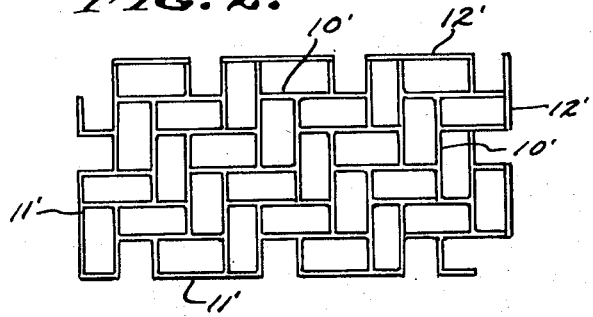
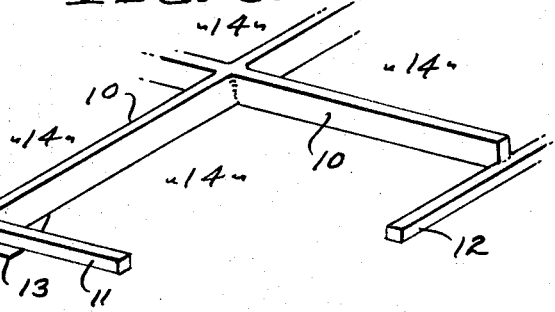
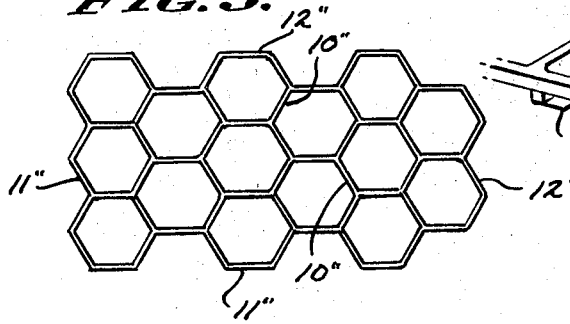
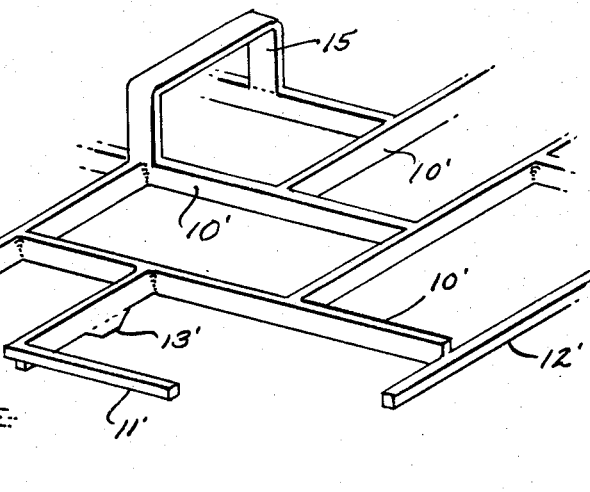
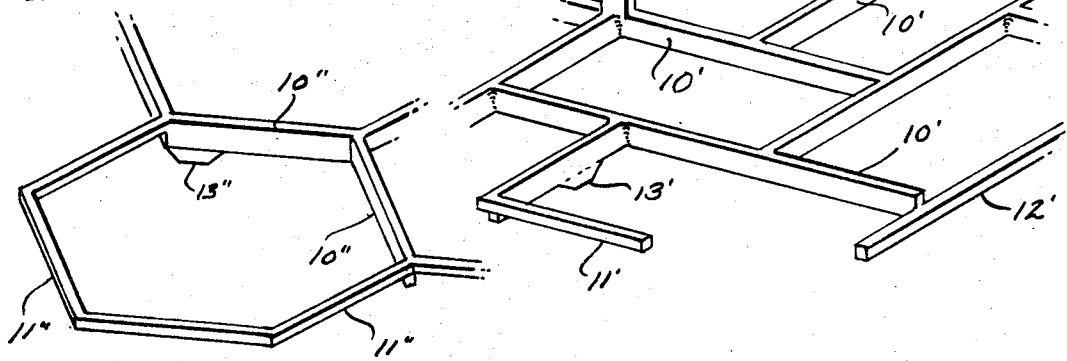

TILE SETTING TEMPLATE

BACKGROUND

Tile setting is a manual process that involves placing individual tiles in alignment with each other and with respect to the corners and edges of a floor or wall. Tile varies in dimension as well as in squareness, and this presents problems when using ordinary guide lines and straight edges which require the repeated "straightening up" process. Therefore, tile setting templates are used in order to position tile so as to minimize the repeated process of "straightening up", which is usually repeated every few rows of tile. Whereas, when using a template as herein disclosed the "straightening up" process is usually repeated every few "frames" or every six to 18 rows of tile.

It will be observed that tile setting templates of the type under consideration are moved from one position to another, and heretofore there has been no provision for the adjacent interengagement of a multiplicity of such templates. For example, typical prior art templates have marginal configurations which prevents their adjacent interengagement, and it is therefore necessary to overlap one row of tile with the template each time the template is moved to a new tile setting position, or the template is merely abutted with the last row of set tile and more frequent "straightening up" is resorted to. In any case, there is a limit to practical size for such templates, and alignment and "straightening up" remains to be a difficult problem. Further, each time that such a template is moved, extra precaution must be taken to remove particles, such as sand which usually adheres to and accumulates upon the rack members which coextensively contact the supporting surface in the prior art templates.

FIELD OF INVENTION

The practical size of templates of the type under consideration is limited while large sized templates are highly desired. Therefore, it is an object of this invention to provide a template which is adapted to be used in multiform and wherein a multiplicity of like templates are interengageable in a manner to maintain alignment. With the present invention, the template has at least a pair of opposite margins and wherein said margins are interengageable respectively within the confines of the tile joint that is subsequently grouted. In practice, the template unit is quadrilateral in plan configuration and the two pairs of opposite margins are interengageable.

The art of tile setting involves many different patterns and various shaped tile; for example, running bond, square herringbone, basket and other such patterns; and for example square tile, rectangular tile, hexagonal tile, and others. Therefore, it is an object of this invention to provide a template of quadrilateral configuration and with interengageable opposite margins conducive to receiving whole tiles without restriction. With the present invention, complex patterns do not limit the interengageability while whole tile can project beyond the interengageable margins of the template.

There are various types of beds upon which tile is set, such as a screeded layer of sand and cement or a cemented (adhesive) floor, and the coextensive support of a template upon said bed results in a constant cleaning requirement as the template picks up particles and/or the cement (adhesive). Therefore, it is an object of this invention to provide means positioning the template per se above said bed, and doing so without interferring with the "joint" space between the tile being set. With the present invention, legs depend from the rack which comprises the template, said legs holding the rack spaced from the supporting bed.

SUMMARY OF INVENTION

This invention relates to improvements in tile setting templates comprising a rack of tile separating members 10 embraced within the confines of opposite marginal frame members 11 and 12 that define a quadrilateral unit. A characteristic feature of the invention is the capability of interengagement between a multiplicity of template units, one being alignably engageable with the other within the confines of the "joint" or space between the tiles as created and/or established by the separating members 10 and the frame members 11 and 12, all of said members being of the uniform and required thickness establishing the "joint" to be grouted. A characteristic feature of the invention is the provision of legs 13 which depend from the rack to a uniform supporting plane with the rack of said members held above and in spaced relation to said plane.

DRAWINGS

The various objects and features of this invention will be fully understood from the following detailed description of the typical preferred forms and applications thereof, throughout which description reference is made to the accompanying drawings, in which:

FIGS. 1, 2 and 3 are plan views of three typical tile setting patterns and typically distinctive tile configurations; FIG. 1 illustrating a conventional square pattern; FIG. 2 illustrating a square herringbone pattern; and FIG. 3 illustrating a hexagonal pattern. FIGS. 4 and 5 are enlarged detailed fragmentary views taken as indicated by lines 4—4 and 5—5 on FIG. 1; FIG. 6 is a perspective view illustrating a corner portion of the template shown in FIG. 1; FIG. 7 is a perspective view illustrating a corner portion of the template shown in FIG. 2; and FIG. 8 is a perspective view illustrating a corner portion of the template shown in FIG. 3.

PREFERRED EMBODIMENT

Referring now to the drawings, the rack of separating members 10 can be arranged as required to establish the desired pattern for setting tile, while the frame members 11 and 12 can be embraced therearound with variations as will be observed from an examination of FIGS. 6, 7 and 8 illustrating three typical pocket configurations for the tile. Note that the margins of the quadrilateral rack are continuous in one example and interrupted in the other two examples, so as to permit the reception of whole tile in the locating pockets, but without adverse effect upon the adjacent interengagement herein after described. In FIG. 1 the tile is square and set in a square pattern, in which case the frame members 11 and 12 are advantageously continuous. In FIG. 2 the tile is rectangular and set in a square herringbone pattern, in which case the frame members 11 and 12 are necessarily interrupted. And, in FIG. 3 the tile is hexagonal and set in a corresponding "honeycomb" pattern, and which case the members 11 and 12 are again necessarily interrupted.

The most common and fundamental pattern for setting tile is shown in FIGS. 1 and 6 wherein a plurality of adjacently related tile setting pockets 14 are comprised of right angularly disposed separating members 10 fitted together in corner to corner relation, with the "joints" or spaces established by the thickness of the members which ar aligned so that the "joints" are continuously straight. In practice with Quarry Tile, the separating members 10 are one-eighth inch thick and one-fourth inch deep, and all are of this identical cross section and welded or brazed or otherwise fused together where they join at the pocket corners. In this pattern configuration it is most practical to provide continuous longitudinal members 10 and interrupted transverse members 10 joined to the frame members in abutted relationship with the tops and bottoms of all said members coplanar respectively. The frame members 11 and 12 embrace the pattern comprised of the separating members 10, and in accordance with this invention the said frame members are provided in pairs that are opposite and thereby adapted to be interengageable. That is, one member 11 of one template unit is interengageable with the opposite member 12 of a second template unit, and so on, this feature of interengageability being true of side to side extension of one unit from another as well as end to end extension thereof. Accordingly, the frame members 11 and 12 key together within the confines of the "joint" or space to be established between adjacent tiles, in this instance a one-eighth inch space for the grouted joint. Therefore, the upper half portion of the "joint" is occupied by the frame member 11 and the lower half portion of the "joint" is occupied by the frame member 12; the frame member 11 being welded, brazed or otherwise fused to the outer margins of the unit flush with the top plane thereof; the frame member 12 being welded, brazed or otherwise fused to the outer margins of the unit flush with the bottom plane thereof. It will be apparent that the two pairs of end frame members and side frame members 11 and 12 are complementary and together occupy a cross section identical to that of any one of the separating members 10. A feature of the quadrilateral frame is that the end and side members 11 and 12 abut in upper and lower planes at diagonally opposite corners; that is, the members 11 abut at one corner while the members 12 abut at the opposite corner of the frame. Alternately, the end and side members 11 and 12 would overlap at the other diagonally opposite corners of the frame, except that they terminate short of these corners as clearly shown throughout the drawings (see FIGS. 6 and 7), in order to provide for universal end to end and side to side interengagement of the templates.

The squared herringbone pattern for setting tile is shown embodied in the template of FIGS. 2 and 7 wherein the plurality of adjacently related tile setting pockets 14' are comprised of right angularly disposed separating members 10' fitted together in normal relation and which are aligned so that the "joints" are discontinuous. That is, the "joints" are interrupted by the pattern characterized by elongatedly rectangular tiles arranged in normal side to end relation, in which case each "joint" continues the length of one tile plus the width of another, as clearly shown in FIG. 2; and said discontinuity repeatedly occurs along the margins of the templates at the ends and sides thereof which are comprised of the interengageable frame members 11' and 12'. Accordingly, the frame members 11' and 12' stop where they are interrupted by the pattern of tiles that will intermittently protrude from the margins of the template where said frame members are abutted and joined to the terminating separating members 10', as shown.

The hexagonal pattern for setting tile is shown embodied in the template of FIGS. 3 and 8 wherein the plurality of adjacently related tile setting pockets 14'' are comprised of angularly disposed separating members 10'' fitted together in 120° relation with the "joints" between adjacent tiles at opposite corners diametrically aligned so that the said "joints" are discontinuous. Note that there are six "joint" alignments in this pattern, and one of which is employed at the sides of the template involving the frame members 11'' and 21'' (much the same as described above with the herringbone pattern). That is, the "joints" are interrupted by the pattern characterized by the truncated portions of whole tiles that will protrude from the margins of the template; and said discontinuity repeatedly occurs along the margins of the template at the ends and at the sides thereof. In the template now under consideration, the side frame member 11'' and 12'' are in straight alignment the same as hereinabove described, whereas the end frame members are angularly zigzagged 30° as shown in order to coincide with the pattern configuration. Accordingly, the end frame members 11'' are correspondingly disposed, the frame member 11'' at one end of the template being flush with the top plane and the frame member 11'' at the other end being flush with the bottom plane thereof, and the two being complementary so as to occupy the "joint" space between the tiles.

Referring now to FIGS. 4 and 6 of the drawings, the legs 13 are provided on the separating members 10 within the confines of the frame members 11 and 12, and to the end that the interengageability is not encumbered. In practice, several localized legs 13 are employed in sufficient numbers as may be required to stabilize the particular pattern involved. Normally, four to six such legs will suffice and in the case of Quarry Tile and the aftermentioned dimensions thereof, the legs are of the same width as the separating members and depend therefrom one-eighth inch. Thus, the template is three-eighths inch in depth and spaces the Quarry Tile one-eighth inch for grouting there between.

Manipulation and handling is facilitated by the provision of upstanding handles 15 one of which is shown in FIG. 7, whereby the template is lifted and by which it is repositioned.

From the foregoing it will be seen that the template-rack is held above the supporting surface by means of localized legs which are cleansed with far greater facility than cleaning of the entire template-rack before each repositioning of the same. The unit size of the template is minimized and multiple units thereof cooperatively employed, one to extend the other in right angle directions from either end or from either side. The complexity of patterns does not interfer with interengageability and all to the end that the advantage of such templates is extended to minimum sized units thereof which are far more durable and which are handled with greater facility and to greater advantage.

Having described only typical preferred forms and applications of my invention, I do not wish to be limited or restricted to the specific details herein set forth, but wish to reserve to myself any modifications or variations that may appear to those skilled in the art.

I claim:

1. Interengageable templates of basically rectangular plan form for setting of tiles of predetermined shape and in a predetermined pattern and each comprising; a rack of rectangularly cross sectioned separating members of uniform width and depth forming openings in a repeated pattern for receiving and spacing the tiles, a frame member at one margin of the rack and occupying the upper portion of space between tiles, and a frame member at the opposite margin of the rack and occupying the lower portion of space between tiles, one frame member of one template being overlapped with the opposite frame member of another template for mutually positioned interengageability when extending said pattern by means of mating the said frame members of the two such templates together into a uniform tile spacing cross section corresponding to the first mentioned cross sections of the separating members.

2. The interengageable tile setting templates as set forth in claim 1 wherein the frame members at the said one and opposite margins of the rack are continuously coextensive with said margins respectively.

3. The interengageable tile setting template as set forth in claim 1 and wherein the frame members at the said one and opposite margins of the rack are interrupted and extend between spaced separating members between which tiles are received.

* * * * *